US012251760B2

(12) United States Patent
Kato et al.

(10) Patent No.: US 12,251,760 B2
(45) Date of Patent: Mar. 18, 2025

(54) MAGNETIC CORE POWDER, MAGNETIC CORE AND COIL DEVICE USING IT, AND METHOD FOR PRODUCING MAGNETIC CORE POWDER

(71) Applicant: PROTERIAL, LTD., Tokyo (JP)

(72) Inventors: Tetsuro Kato, Tokyo (JP); Nobuhiko Chiwata, Tokyo (JP); Motoki Ohta, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 1053 days.

(21) Appl. No.: 17/266,281

(22) PCT Filed: Aug. 22, 2019

(86) PCT No.: PCT/JP2019/032807
§ 371 (c)(1),
(2) Date: Feb. 5, 2021

(87) PCT Pub. No.: WO2020/040250
PCT Pub. Date: Feb. 27, 2020

(65) Prior Publication Data

US 2021/0313111 A1 Oct. 7, 2021

(30) Foreign Application Priority Data

Aug. 23, 2018 (JP) ................................ 2018-156415

(51) Int. Cl.
*H01F 1/153* (2006.01)
*B22F 1/052* (2022.01)
(Continued)

(52) U.S. Cl.
CPC .............. *B22F 5/106* (2013.01); *B22F 1/052* (2022.01); *B22F 1/08* (2022.01); *H01F 1/15308* (2013.01);
(Continued)

(58) Field of Classification Search
CPC .... B22F 1/052; B22F 1/06; B22F 1/08; B22F 1/09; H01F 1/06; H01F 1/061;
(Continued)

(56) References Cited

U.S. PATENT DOCUMENTS 10,283,266 B2 5/2019 Nakabayashi et al.
2015/0240040 A1* 8/2015 Kasahara ................ C08K 3/26 524/425

(Continued)

FOREIGN PATENT DOCUMENTS

JP 2001-196216 A 7/2001
JP 2007-134381 A 5/2007

(Continued)

OTHER PUBLICATIONS

Office Action dated Aug. 29, 2022 issued in Chinese Application No. 201980052525.0.

(Continued)

*Primary Examiner* — Vanessa T. Luk
(74) *Attorney, Agent, or Firm* — Sughrue Mion, PLLC

(57) ABSTRACT

A magnetic core powder including granular powder A of Fe-based, magnetic, crystalline metal material and granular powder B of Fe-based, magnetic, amorphous metal material; the particle size d50A of granular powder A at a cumulative frequency of 50 volume % being 0.5 μm or more and 7.0 μm or less, and the particle size d50B of granular powder B at a cumulative frequency of 50 volume % being more than 15.0 μm, in a cumulative distribution curve showing the relation between particle size and cumulative frequency from the smaller particle size side, determined by a laser diffraction method; the magnetic core powder meeting (d90M−d10M)/d50M of 1.6 or more and 6.0 or less, d10M being a particle size at a cumulative frequency of 10 volume %, d50M being a particle size at a cumulative frequency of (Continued)

50 volume %, and d90M being a particle size at a cumulative frequency of 90 volume %.

5 Claims, 2 Drawing Sheets

(51) Int. Cl.

| | |
|---|---|
| ***B22F 1/08*** | (2022.01) |
| ***B22F 5/10*** | (2006.01) |
| ***H01F 3/08*** | (2006.01) |
| ***H01F 27/255*** | (2006.01) |
| ***H01F 41/02*** | (2006.01) |

(52) U.S. Cl.
CPC ............. *H01F 3/08* (2013.01); *H01F 27/255* (2013.01); *H01F 41/0246* (2013.01); *Y10T 428/115* (2015.01)

(58) Field of Classification Search
CPC .......... H01F 1/063; H01F 1/065; H01F 1/066; H01F 1/068; H01F 1/08; H01F 1/083; H01F 1/086; H01F 1/14733; H01F 1/14741; H01F 1/1475; H01F 1/14758; H01F 1/14766; H01F 1/14775; H01F 1/14783; H01F 1/14791; H01F 1/153; H01F 1/15308; H01F 1/15316; H01F 1/15325; H01F 1/15333; H01F 1/15341; H01F 1/1535; H01F 1/15358; H01F 1/15366; H01F 1/15375; H01F 1/15383; H01F 1/20; H01F 1/22; H01F 1/24; H01F 1/26; H01F 1/28; H01F 27/24; H01F 27/25; H01F 27/255; H01F 27/28
See application file for complete search history.

(56) References Cited

U.S. PATENT DOCUMENTS

| | | | | |
|---|---|---|---|---|
| 2017/0309387 | A1 | 10/2017 | Nakabayashi et al. | |
| 2018/0021853 | A1 | 1/2018 | Takadate et al. | |
| 2018/0108465 | A1* | 4/2018 | Takahashi | H01F 1/15333 |

FOREIGN PATENT DOCUMENTS

| | | | | | |
|---|---|---|---|---|---|
| JP | 2010-118486 | A | | 5/2010 | |
| JP | 2017-108098 | A | | 6/2017 | |
| WO | 2016/185940 | A1 | | 11/2016 | |
| WO | WO-2016204008 | A1 | * | 12/2016 | B22F 1/0007 |

OTHER PUBLICATIONS

International Search Report for PCT/JP2019/032807 dated Nov. 19, 2019 [PCT/ISA/210].

* cited by examiner

MAGNETIC CORE POWDER, MAGNETIC CORE AND COIL DEVICE USING IT, AND METHOD FOR PRODUCING MAGNETIC CORE POWDER

CROSS REFERENCE TO RELATED APPLICATIONS

This application is a National Stage of International Application No. PCT/JP2019/032807 filed Aug. 22, 2019, claiming priority based on Japanese Patent Application No. 2018-156415 filed Aug. 23, 2018.

FIELD OF THE INVENTION

The present invention relates to a magnetic core powder, and a magnetic core and a coil device using it, which are suitable for transformers, choke coils, reactors, etc. used in switching power supplies, etc., and a method for producing a magnetic core powder.

BACKGROUND OF THE INVENTION

Switching power supplies are used in electric vehicles (EVs), hybrid electric vehicles (HEVs), plug-in hybrid electric vehicles (PHEVs), mobile communications equipment (cell phones, smartphones, etc.), personal computers, servers, etc., and power supply circuits such as DC-DC converters, etc. are getting operable at lower voltage, larger current and higher switching frequencies, and required to be smaller and lighter in weight with smaller power consumption for energy saving.

For higher frequencies and larger current of power supply circuits, coil devices are required to be operable at as high frequencies as 100 kHz or more with higher exciting magnetic flux densities. As a result, powders of soft-magnetic metal materials such as Fe-based amorphous alloys, pure iron, Fe-based crystalline alloys of Fe—Si, Fe—Si—Cr, etc. are increasingly used for magnetic cores. Suitable as soft-magnetic material powders are granular powders formed by atomizing methods, which do not suffer the shape anisotropy of magnetic properties when formed into magnetic cores, and exhibit good powder flowability in molding magnetic cores.

Coil devices excited by AC current with DC current superimposed are required to have excellent DC superimposition characteristics, by which decrease in inductance is suppressed up to a high current level. Also, to make coil devices smaller, magnetic cores should have higher permeability. For example, JP 2007-134381 A, JP 2010-118486 A and JP 2017-108098 A describe that to utilize good features of soft-magnetic materials, amorphous alloy powder and crystalline alloy powder having different compositions are mixed to reduce core loss. Also, JP 2017-108098 A describes that DC superimposition characteristics are improved by using amorphous alloy powder and crystalline alloy powder having different average particle sizes with their particle size distributions properly adjusted.

OBJECT OF THE INVENTION

Coil devices are further required to be smaller with higher DC superimposition characteristics. Accordingly, an object of the present invention is to provide a magnetic core powder which can easily provide high permeability and improved DC superimposition characteristics when formed into magnetic cores, a magnetic core and a coil device using it, and a method for producing such magnetic core powder.

SUMMARY OF THE INVENTION

Thus, an embodiment of the present invention provides a magnetic core powder comprising a granular powder A of an Fe-based, magnetic, crystalline metal material, and a granular powder B of an Fe-based, magnetic, amorphous metal material; the particle size d50A of the granular powder A at a cumulative frequency of 50% by volume being 0.5 μm or more and 7.0 μm or less, and the particle size d50B of the granular powder B at a cumulative frequency of 50% by volume being more than 15.0 μm, in a cumulative distribution curve showing the relation between a particle size and a cumulative frequency from the smaller particle size side, which is determined by a laser diffraction method; and the magnetic core powder meeting (d90M−d10M)/d50M of 1.6 or more and 6.0 or less, wherein d10M represents the particle size of the magnetic core powder at a cumulative frequency of 10% by volume, d50M represents the particle size of the magnetic core powder at a cumulative frequency of 50% by volume, and d90M represents the particle size of the magnetic core powder at a cumulative frequency of 90% by volume.

In the magnetic core powder, the d50A is preferably 1.0 μm or more and 5.0 μm or less.

In the magnetic core powder, the Fe-based, magnetic, crystalline metal material is preferably at least one magnetic crystalline material selected from the group consisting of pure iron, Fe—Si-based, magnetic, crystalline materials, Fe—Si—Cr-based, magnetic, crystalline materials, Fe—Si—Al-based, magnetic, crystalline materials, and Fe—Cr—Al-based, magnetic, crystalline materials.

In the magnetic core powder, the Fe-based, magnetic, amorphous metal material is preferably Fe—Si—B-based and/or Fe—P—C-based, magnetic, amorphous materials.

Another embodiment of the present invention provides a magnetic core using the above magnetic core powder.

A further embodiment of the present invention provides a coil device using the above magnetic core.

A still further embodiment of the present invention provides a method for producing a magnetic core powder comprising the steps of preparing a granular powder A of an Fe-based, magnetic, crystalline material, in which a particle size d50A at a cumulative frequency of 50% by volume is 0.5 μm or more and 7.0 μm or less, in a cumulative distribution curve showing the relation between a particle size and a cumulative frequency from the smaller particle size side, which is determined by a laser diffraction method;

preparing a granular powder B of an Fe-based, magnetic, amorphous metal material, in which a particle size d50B at a cumulative frequency of 50% by volume is more than 15.0 μm, in a cumulative distribution curve showing the relation between a particle size and a cumulative frequency from the smaller particle size side, which is determined by a laser diffraction method; and mixing the granular powder A with the granular powder B;

the magnetic core powder obtained through the above mixing step meeting (d90M−d10M)/d50M of 1.6 or more and 6.0 or less, wherein d10M represents the particle size of the magnetic core powder at a cumulative frequency of 10% by volume, d50M represents the particle size of the magnetic core powder at a cumulative frequency of 50% by volume, and d90M represents the particle size of the magnetic core powder at a cumulative frequency of 90% by volume.

In the method for producing the magnetic core powder, the d50A is preferably 1.0 μm or more and 5.0 μm or less.

In the method for producing a magnetic core powder, the Fe-based, magnetic, crystalline metal material is preferably at least one magnetic crystalline material selected from the group consisting of pure iron, Fe—Si-based, magnetic, crystalline materials, Fe—Si—Cr-based, magnetic, crystalline materials, Fe—Si—Al-based, magnetic, crystalline materials, and Fe—Cr—Al-based, magnetic, crystalline materials.

In the method for producing a magnetic core powder, the Fe-based, magnetic, amorphous metal material is preferably an Fe—Si—B-based and/or Fe—P—C-based, magnetic, amorphous material.

Effects of the Invention

The present invention can provide magnetic core powder capable of forming magnetic cores with high permeability and improved DC superimposition characteristics, and a magnetic core and a coil device using it, and a method for producing such magnetic core powder.

DESCRIPTION OF THE PREFERRED EMBODIMENTS

Figure 1:
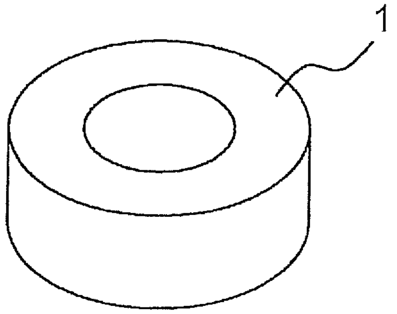
FIG. 1 is a perspective view showing an example of magnetic cores according to an embodiment of the present invention.

Magnetic core powders, and magnetic cores and coil devices using them according to an embodiment of the present invention will be specifically explained below, without intention of restricting the present invention thereto. In part or all of the figures, portions unnecessary for explanations are omitted, and some portions are enlarged or shrunken for the easiness of explanation. The sizes and shapes and positional relations of constituent members described for explanation are not restrictive unless otherwise mentioned. In the explanation, the same names and reference numerals indicate the same or similar members, and the explanations of some depicted portions may be omitted.

The magnetic core powder according to an embodiment of the present invention is a powder mixture comprising a granular powder A of an Fe-based, magnetic, crystalline metal material and a granular powder B of an Fe-based, magnetic, amorphous metal material. The term "granular powder" means substantially spherical powder obtained, for example, by an atomizing method. Though the powder is preferably in a spherical shape, but it may be in a nonspherical shape having shape anisotropy, such as an elliptical or liquid drop shape, in which a ratio (Dl/Ds) of the major axis Dl to the minor axis Ds is preferably 1.3 or less. Each of the granular powder A of an Fe-based, magnetic, crystalline metal material and the granular powder B of an Fe-based, magnetic, amorphous metal material may be composed of pluralities of magnetic metal materials having different compositions.

The granular powder A of an Fe-based, magnetic, crystalline metal material in an embodiment of the present invention has a particle size d50A (corresponding to a cumulative frequency of 50% by volume) of 0.5 μm or more and 7.0 μm or less, in a cumulative distribution curve showing the relation between a particle size and a cumulative frequency from the smaller particle size side, which is determined by a laser diffraction method. The Fe-based, magnetic, crystalline metal material is, for example, at least one magnetic crystalline material selected from the group consisting of pure iron, Fe—Si-based, magnetic, crystalline materials, Fe—Si—Cr-based, magnetic, crystalline materials, Fe—Si—Al-based, magnetic, crystalline materials, and Fe—Cr—Al-based, magnetic, crystalline materials. The granular powder B of an Fe-based, magnetic, amorphous metal material in an embodiment of the present invention has a particle size d50B (corresponding to a cumulative frequency of 50% by volume) of more than 15.0 μm. The granular powder A having such a particle size as to fill gaps between large powder particles B can increase the density of the magnetic core, thereby decreasing magnetic gaps between particles, and thus providing improved magnetic properties. When the granular powder A has d50A of less than 0.5 μm, large contribution to improving magnetic properties cannot be obtained. The d50A is preferably 1.0 μm or more, and further preferably 1.5 μm or more. With d50A of 7.0 μm or less, gaps can be highly filled. The d50A is preferably 5.0 μm or less.

The powder mixture having a larger average particle size has larger influence on magnetic properties, when formed into magnetic cores. Taking into consideration the DC superimposition characteristics of coil devices produced, it is preferable to select the granular powder B of the Fe-based, magnetic, amorphous metal material, such that preferential magnetic properties among saturation magnetic flux density, core loss, permeability, etc. are obtained when formed into magnetic cores. The granular powder B has d50B of more than 15.0 μm. Because magnetic properties, etc. are largely influenced by the granular powder B when formed into magnetic cores as described above, the d50B is preferably 18.0 μm or more, and further preferably 20.0 μm or more, to obtain particularly large permeability Because a larger particle size makes it difficult to obtain more spherical particles and production conditions stricter by increased cooling speed for amorphization, the d50B is preferably 35.0 μm or less, and further preferably 30.0 μm or less.

The magnetic core powder as a powder mixture meets (d90M−d10M)/d50M of 1.6 or more and 6.0 or less, wherein d10M represents a particle size at a cumulative frequency of 10% by volume, d50M represents a particle size at a cumulative frequency of 50% by volume, and d90M represents a particle size at a cumulative frequency of 90% by volume. (d90M−d10M)/d50M is called "particle size ratio P" below for the easiness of explanation. The particle size ratio P of less than 1.6 or more than 6.0 likely provides low permeability, failing to improve the DC superimposition characteristics of coil devices. The d50M of the magnetic core powder as a powder mixture is preferably 20.5 μm or less, further preferably 20.0 μm or less, and most preferably 19.0 μm or less. The d50M is preferably more than 6.1 μm, and further preferably 6.2 μm or more.

The powders A and B can be produced by atomizing methods, for example, methods for disintegrating a melt by water or gas, such as a gas-atomizing method, a water-atomizing method, a high-speed water rotation atomizing method, etc., or a high-speed flame-atomizing method using a flame jet ejected at an ultrasonic or near-sonic speed, etc.

According to investigation by the inventors, the gas atomizing method is suitable to obtain granular powder having a median diameter of 30 μm or more, and the high-speed flame-atomizing method is suitable to obtain granular powder having a median diameter of 10 μm or less. Though not so widely used as other atomizing methods, the high-speed flame-atomizing method is described in JP 2014-136807 A, etc. In the high-speed flame-atomizing method, a melt is disintegrated to powder by a high-speed flame generated by a high-speed burner, and cooled by a rapid-cooling mechanism comprising pluralities of nozzles ejecting a cooling medium such as liquefied nitrogen, liquefied carbon dioxide, etc.

The composition of the granular powder A is preferably aFe bSi cCr dA1 eC, wherein a=100−b−c−d−e, 0≤b≤12.0, 0≤c≤8.0, 0≤d<13.8, and 0≤e≤0.5, on a %-by-mass basis.

When the Fe-based, magnetic, crystalline metal material of the granular powder A is an Fe—Si-based material, its constituent elements are substantially Fe and Si, and Cr, Al and C may be inevitably contained. The "b" preferably meets 0.5≤b≤7.6. Si, a main component of Fe—Si crystal, is dissolved in Fe, a main element having influence on magnetic properties such as saturation magnetization, etc., contributing to decrease in magnetostriction and magnetic anisotropy. Si is preferably 0.5% or more by mass, further preferably 1.0% or more by mass, and most preferably 2.0% or more by mass. To provide good moldability in compression molding and a high saturation magnetic flux density, Si is preferably 7.6% or less by mass, further preferably 7.0% or less by mass, and most preferably 6.0% or less by mass. C may be added to stabilize the viscosity of the melt, and its upper limit is 0.5% by mass. Accordingly, the "e" is preferably 0≤e≤0.5, and further preferably 0.3% or less by mass. The balance is Fe and inevitably contained components, which may be called inevitable impurities.

When the Fe-based, magnetic, crystalline metal material is an Fe—Si—Cr-based material, its constituent elements are substantially Fe, Si and Cr, and Al and C may be inevitably contained. The "b" and "c" preferably meet 0.5≤b≤7.6, and 0.3≤c≤6.0, respectively. For the same reasons as described above, Si is preferably 0.5% or more by mass, further preferably 1.0% or more by mass, and most preferably 2.0% or more by mass. To obtain a high saturation magnetic flux density, Si is preferably 7.6% or less by mass, further preferably 7.0% or less by mass, and most preferably 6.0% or less by mass. Cr, an effective element for improving the corrosion resistance and insulation resistance of the alloy, is preferably 0.3% or more by mass, further preferably 0.5% or more by mass, and most preferably 1.0% or more by mass. To obtain a high saturation magnetic flux density, Cr is preferably 6.0% or less by mass, further preferably 5.5% or less by mass, and most preferably 5.0% or less by mass. For the same reasons as described above, C is preferably 0≤e≤0.5, and more preferably 0.3% or less by mass. The balance is Fe and inevitably contained components, which may be called inevitable impurities.

When the Fe-based, magnetic, crystalline metal material is an Fe—Si—Al-based material, its constituent elements are substantially Fe, Si and Al except for Cr and C which may be inevitably contained. The "b" and "d" preferably meet 0.5≤b≤12.0, and 1.5≤d<13.8, respectively. For the same reasons as described above, Si is preferably 0.5% or more by mass, further preferably 1.0% or more by mass, and most preferably 2.0% or more by mass. To obtain a high saturation magnetic flux density, Si is preferably 12.0% or less by mass, more preferably 10.0% or less by mass, and most preferably 8.0% or less by mass. Al is an effective element for improving the corrosion resistance of the alloy, and increase in Al tends to lower the magnetic anisotropy constant. Al is preferably 1.5% or more by mass, further preferably 2.0% or more by mass, and most preferably 2.5% or more by mass. To obtain a high saturation magnetic flux density and low hysteresis loss, Al is preferably less than 13.8% by mass, further preferably 12.0% or less by mass, and most preferably 10.0% or less by mass, making it difficult to form a regular $Fe_3Al$ structure. For the same reasons as described above, C is preferably 0≤e≤0.5, and more preferably 0.3% or less by mass. The balance is Fe and inevitably contained components, which may be called inevitable impurities.

When the Fe-based, magnetic, crystalline metal material is an Fe—Cr—Al-based material, its constituent elements are substantially Fe, Cr and Al except for Si and C which may be inevitably contained. The "c" and "d" are preferably 0.3≤Cr≤8.0, and 1.5≤d<13.8, respectively. Cr, an effective element for improving the corrosion resistance and insulation resistance of the alloy, is preferably 0.3% or more by mass, further preferably 0.5% or more by mass, and most preferably 1.0% or more by mass. To obtain a high saturation magnetic flux density, Cr is preferably 8.0% or less by mass, further preferably 7.0% or less by mass, and most preferably 6.0% or less by mass. For the same reasons as described above, Al is preferably 1.5% or more by mass, further preferably 2.0% or more by mass, and most preferably 2.5% or more by mass. Also, Al is preferably less than 13.8% by mass, further preferably 12.0% or less by mass, and most preferably 10.0% or less by mass, making it difficult to faun a regular $Fe_3Al$ structure. For the same reasons as described above, C is preferably 0≤e≤0.5, and more preferably 0.3% or less by mass. Si may be added as a deoxidizer or to improve the magnetic properties, and its upper limit is 4.0% by mass. Accordingly, the "b" is preferably 0≤b≤4.0, further preferably 3.0% or less by mass, and most preferably 1.0% or less by mass. The balance is Fe and inevitably contained components which may be called inevitable impurities.

Other metals which may be contained are Mg, Ca, Ti, Mn, Co, Ni, Cu, etc., except for inevitable impurities.

When an Fe—Si—B-based, amorphous, magnetic metal material is used for the granular powder B of the Fe-based, magnetic, amorphous metal material, its composition is preferably $(Fe_{1-x}Cr_x)_a(Si_{1-y}B_y)_{100-a-b}C_b$, wherein x and y meet 0<x≤0.06, and 0.3≤y≤0.7 by atomic ratio, and a and b meet 70≤a≤81, and 0<b≤2 by atomic %. Cr is an effective element for improving the oxidation resistance and corrosion resistance of the alloy and the amorphization of Si, B and C. 3.0 atomic % or less of Mn may be further contained as an arbitrary element. In addition, inevitable impurities may be contained.

When the granular powder B is made of an Fe—P—C-based, magnetic, amorphous metal material, its composition is preferably $Fe_{100-x-y}P_xC_y$, wherein 6.8%≤x≤13.0%, and 2.2%≤y≤13.0% by atomic %. P and C are effective elements for higher amorphization. To improve the amorphization, at least one element of Ni, Sn, Cr, B and Si may be contained as an additional arbitrary element. Ni is 10.0% or less, Sn is 3.0% or less, Cr is 6.0% or less, B is 9.0% or less, and Si is 7.0% or less, by atomic %. In addition, inevitable impurities may be contained.

The inevitable impurities are, for example, S, O, N, etc., and their amounts are preferably as follows: S is 200 ppm or less, O is 5000 ppm or less, and N is 1000 ppm or less.

The magnetic core powder according to an embodiment of the present invention is suitable for compacted magnetic cores or metal composites. In the case of the compacted magnetic core, for example, the magnetic core powder is mixed with a binder functioning as an insulator and a bonding material. As the binder, epoxy resins, unsaturated polyester resins, phenol resins, xylene resins, diaryl phthalate resins, silicone resins, polyamideimides, polyimides, water glass, etc. may be used, though not restricted thereto. A mixture of the magnetic core powder and the binder can be blended with a lubricant such as zinc stearate, etc., if necessary, and then charged into a molding die, and pressed to a compacted body having a predetermined shape under pressure of about 10 MPa to about 2 GPa by a hydraulic press machine, etc.

The compacted body is then heat-treated at a temperature of 250° C. or higher and lower than the crystallization temperature of the granular powder B of the Fe-based, magnetic, amorphous material for about 1 hour to cure the binder, obtaining a compressed magnetic core. In this case, the heat treatment atmosphere may be an inert atmosphere or an oxidizing atmosphere. Thereafter, the compacted body is preferably heat-treated at a temperature of 450° C. or higher and causing no thermal damage such as the degeneration and decomposition of a binder, to remove molding strain therefrom. In this case, the heat treatment atmosphere may be an inert atmosphere or an oxidizing atmosphere.

Figure 2:
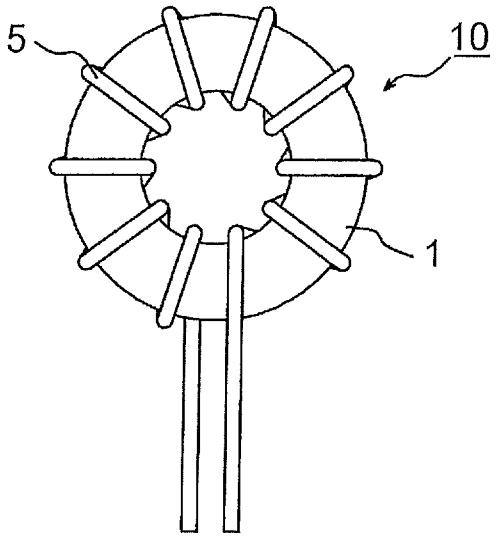
FIG. 2 is a plan view showing an example of coil devices according to an embodiment of the present invention.

FIG. 1 shows an example of the magnetic cores. Though the magnetic core shown in FIG. 1 is in a circular ring shape, the magnetic core 1 may be in a rectangular annular frame shape, etc., or in a rod or plate shape, selectable depending on its applications. FIG. 2 shows an example of coil devices comprising the magnetic core shown in FIG. 1. A copper wire can be wound around the magnetic core 1 as a coil 5, to constitute a coil device 10.

A metal composite core as a coil device (not shown) may be produced by integral molding with a coil embedded in a mixture comprising the magnetic core powder and the binder. For example, by using a proper thermoplastic or thermosetting resin as the binder, a coil-embedded metal composite core can easily be produced by a known molding method such as injection molding, etc.

A mixture comprising the magnetic core powder and the binder may be formed into a sheet-shaped magnetic core by a known sheeting method such as a doctor blade method, etc. Magnetic sheets are suitable for magnetic shields, and back yokes for non-contact charging coils, near field communication antennas, etc.

The magnetic core powder according to an embodiment of the present invention may further contain different soft-magnetic, crystalline metal material powders within a range in which the effects of the present invention can be obtained for magnetic cores.

In any case, the resultant magnetic cores have excellent magnetic properties with improved permeability and DC superimposition characteristics, suitable for inductors, noise filters, choke coils, transformers, reactors, etc.

Example

The magnetic core powder according to an embodiment of the present invention, and a magnetic core and a coil device using it will be explained specifically below, without intention of restricting the present invention thereto. They can be properly modified within the scope of the technical idea.

The production of the granular powder A of the Fe-based, magnetic, crystalline metal material will be explained first. Atomized Fe, Si and Cr were weighed to obtain a composition M1 described below, charged into an alumina crucible, which was placed in a vacuum chamber of a high-frequency induction heating apparatus. After evacuation, they were melted by high-frequency induction heating in an inert atmosphere (Ar), and then cooled to obtain a mother alloy ingot.

Composition of Fe-based, magnetic, crystalline metal material

M1: 92Fe 3.5Si 4.5Cr (% by mass)

The ingot was remelted, and the resultant melt was disintegrated to powder by a high-speed flame-atomizing method. An atomizing apparatus used comprises a vessel for containing a molten metal, a nozzle mounted to a center portion of a bottom of the vessel with communication with the inside of the vessel for ejecting the metal, jet burners (available from Hard Industry) for spraying a flame jet toward a molten metal ejected downward from the nozzle, and a means for cooling the disintegrated melt. This atomizing apparatus can disintegrate the molten metal by a flame jet to molten metal powder, and each jet burner can spray a flame jet at an ultrasonic or near-sonic speed.

The cooling means comprises pluralities of cooling nozzles spraying a cooling medium toward the disintegrated molten metal. The cooling medium may be water, liquefied nitrogen, liquefied carbon dioxide, etc.

The flame jet sprayed from the spraying means was at a temperature of 1300° C., and the ejecting speed of the molten metal was about 3-6 kg/min. Water sprayed as a cooling medium from the nozzles of the cooling means was turned to liquid mist. The cooling speed of the molten metal was adjusted by changing the amount of water sprayed in a range of 4.5-8.5 L/min.

The resultant powder was classified by a centrifugal force classifier (TC-15 available from Nisshin Engineering Inc.), to obtain two types of granular powders A1 and A2 having different average particle sizes.

To produce the granular powder B of the Fe-based, magnetic, amorphous metal material, an Fe—Si—B-based, magnetic, amorphous metal material powder [KUAMET (registered trademark) 6B2 available from Epson Atmix Corporation, median diameter: 30 μm] was used. This KUAMET 6B2 powder was classified by a centrifugal force classifier (TC-15 available from Nisshin Engineering Inc.) to obtain a granular powder B.

Particle Size of Powder

The particle size of each powder was measured by the following method using a laser diffraction particle size distribution meter (LA-920 available from Horiba, Ltd.). Particle sizes d10, d50 and d90 at cumulative percentages of 10% by volume, 50% by volume and 90% by volume from the small size side were determined from a volume-based particle size distribution measured by a laser diffraction method. The d10, d50 and d90 are expressed as d10A, d50A and d90A in the granular powder A (A1 and A2), d10B, d50B and d90B in the granular powder B, and d10M, d50M and d90M in the powder mixture of the granular powder A (A1 and A2) and the granular powder B.

The d10A, d50A and d90A were 2.0 μm, 6.1 μm and 18.2 μm, respectively in the granular powder A1, and 1.2 μm, 2.6 μm and 4.9 μm, respectively in the granular powder A2.

The granular powder B had d10B, d50B and d90B of 10.3 μm, 21.9 μm and 40.5 μm, respectively.

The granular powder A (A1, A2) and the granular powder B were mixed at predetermined ratios shown in Table 1-1 to prepare Powders 1 to 15 (including those containing granular powder A1, A2, B alone). The particle sizes and particle size ratios of Powders 1 to 15 are shown in Table 1-1.

100 parts by mass of each of Powders 1 to 15 was blended with 5 parts by mass of a silicone resin, charged into a molding die, and molded under 100 MPa in a hydraulic press-molding machine, to produce a circular ring-shaped magnetic core of 13.5 mm in outer diameter, 7.7 mm in inner diameter and 2.0 mm in thickness. The density, initial permeability and permeability increment of each magnetic core was evaluated. The results are shown in Table 1-2.

Figure 3:
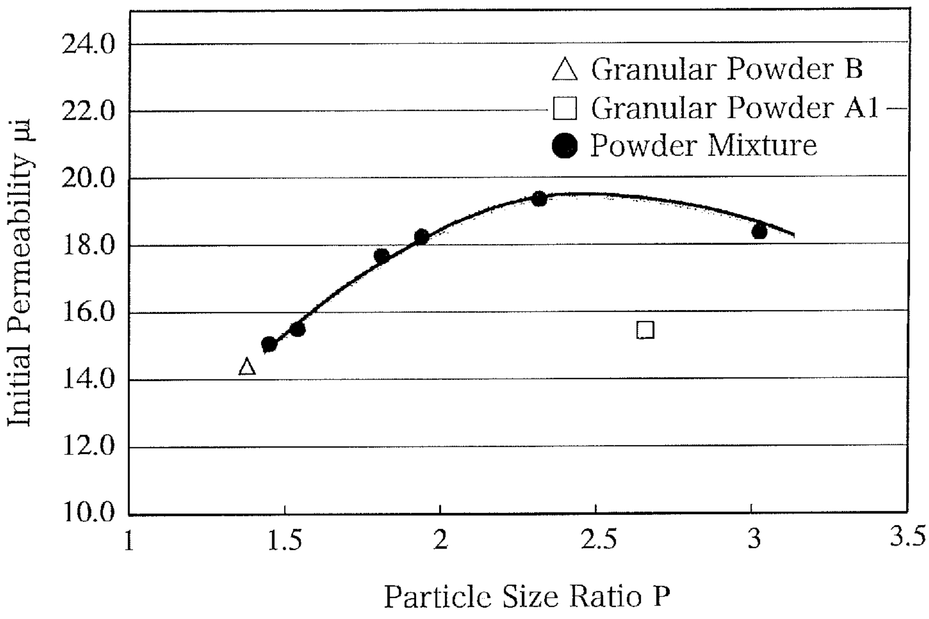
FIG. 3 is a view showing the relation between the particle size ratio P of each of the powders A1 and B and their mixture and the initial permeability μi of a magnetic core formed by each powder.
Figure 4:
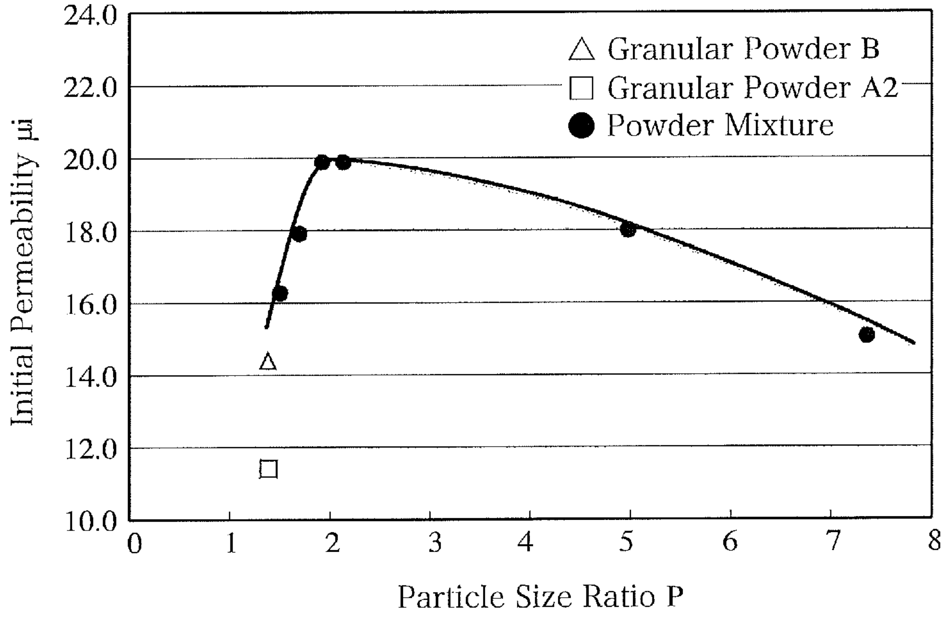
FIG. 4 is a view showing the relation between the particle size ratio P of each of the powders A2 and B and their mixture and the initial permeability μi of a magnetic core formed by each powder.

In the tables, samples of Comparative Examples are distinguished with *. FIGS. 3 and 4 show the relation between a particle size ratio P expressed by (d90M−d10M)/d50M and initial permeability.

Density

The size and weight of each circular ring-shaped magnetic core were measured, and its density was calculated from the measured volume and weight.

Initial Permeability

A conductor wire was wound around each circular ring-shaped magnetic core by 30 turns to form a coil device, whose inductance was measured at room temperature (25° C.) and a frequency of 100 kHz by an LCR meter (4284A available from Agilent Technologies Japan, Ltd.). The initial permeability μi was calculated from the measured inductance by the formula of Initial permeability $\mu i=(le\times L)/(\mu i_0\times Ae\times N^2)$, wherein le is a magnetic path length, L is the inductance (H) of the sample, $\mu i_0$ is the permeability of vacuum$=4\pi\times10^{-7}$ (H/m), Ae is the cross section area of the magnetic core, and N is the number of windings of coil). The initial permeability μi was obtained under the condition of an AC magnetic field of 0.4 A/m.

Permeability Increment μΔ

The inductance L of the coil device used for the measurement of initial permeability was measured at a frequency of 100 kHz and room temperature (25° C.) by LCR meter (4284A available from Agilent Technologies Japan, Ltd.), with a DC magnetic field of 10 kA/m applied by a DC bias-applying apparatus (42841A available from Hewlett-Packard Company). Permeability increment μΔ was determined from the measured inductance by the same formula as for the initial permeability μi. A ratio μΔ/μi (%) was calculated from the permeability increment μΔ and the initial permeability μi.

TABLE 1-1

| | Mixing Ratio (% by mass) | | | | | | Particle |
|---|---|---|---|---|---|---|---|
| | Crystalline Granular Powder | | Amorphous Granular | Particle Size (μm) | | | Size Ratio |
| No. | A1 | A2 | Powder B | d10 | d50 | d90 | P |
| 1* | 0 | 0 | 100 | 10.3 | 21.9 | 40.5 | 1.38 |
| 2* | 5 | 0 | 95 | 9.0 | 21.3 | 39.8 | 1.45 |
| 3* | 10 | 0 | 90 | 7.5 | 20.6 | 39.2 | 1.54 |
| 4 | 20 | 0 | 80 | 5.4 | 18.1 | 38.1 | 1.81 |
| 5 | 30 | 0 | 70 | 4.2 | 17.4 | 37.8 | 1.93 |
| 6 | 50 | 0 | 50 | 3.0 | 13.2 | 33.5 | 2.31 |
| 7 | 70 | 0 | 30 | 2.5 | 9.1 | 29.9 | 3.01 |
| 8* | 100 | 0 | 0 | 2.0 | 6.1 | 18.2 | 2.65 |
| 9* | 0 | 5 | 95 | 8.1 | 21.2 | 39.8 | 1.50 |
| 10 | 0 | 10 | 90 | 4.9 | 20.4 | 39.2 | 1.68 |

TABLE 1-1-continued

| | Mixing Ratio (% by mass) | | | | | | Particle |
|---|---|---|---|---|---|---|---|
| | Crystalline Granular Powder | | Amorphous Granular | Particle Size (μm) | | | Size Ratio |
| No. | A1 | A2 | Powder B | d10 | d50 | d90 | P |
| 11 | 0 | 20 | 80 | 2.6 | 18.5 | 37.9 | 1.91 |
| 12 | 0 | 30 | 70 | 2.1 | 16.2 | 36.5 | 2.12 |
| 13 | 0 | 50 | 50 | 1.6 | 6.3 | 32.9 | 4.97 |
| 14* | 0 | 70 | 30 | 1.4 | 3.5 | 27.1 | 7.34 |
| 15* | 0 | 100 | 0 | 1.2 | 2.6 | 4.9 | 1.39 |

TABLE 1-2

| No. | Density ($\times10^3$ kg/m$^3$) | Initial Permeability μi | Permeability Increment μΔ | μΔ/μi (%) |
|---|---|---|---|---|
| 1* | 4.48 | 14.4 | 12.4 | 86 |
| 2* | 4.65 | 15.1 | 12.9 | 85 |
| 3* | 4.70 | 15.5 | 13.3 | 86 |
| 4 | 4.90 | 17.7 | 14.9 | 85 |
| 5 | 4.94 | 18.3 | 15.4 | 84 |
| 6 | 5.05 | 19.4 | 16.2 | 84 |
| 7 | 4.95 | 18.4 | 15.5 | 84 |
| 8* | 4.72 | 15.4 | 13.4 | 87 |
| 9* | 4.72 | 16.3 | 13.9 | 85 |
| 10 | 4.85 | 17.9 | 15.2 | 85 |
| 11 | 5.00 | 19.9 | 16.8 | 85 |
| 12 | 5.09 | 19.9 | 17.0 | 86 |
| 13 | 4.91 | 18.0 | 15.8 | 88 |
| 14* | 4.76 | 15.1 | 13.7 | 91 |
| 15* | 4.43 | 11.4 | 10.7 | 94 |

As shown in Tables 1-1 and 1-2, and FIGS. 3 and 4, the use of Powders 4 to 7 having particle size ratios P of 1.6 or more and 6.0 or less, which were obtained by mixing the granular powder A1 and the granular powder B, and Powders 10 to 13 having particle size ratios P of 1.6 or more and 6.0 or less, which were obtained by mixing the granular powder A2 and the granular powder B provided excellent DC superimposition characteristics and high permeability with large initial permeability pi and permeability increment μΔ, though providing μΔ/μi on the same level as those of magnetic cores formed by the granular powder B of the Fe-based, magnetic, amorphous metal material only. On the other hand, Powders 2*, 3*, 9* and 14* not meeting the condition of the particle size ratio P, Powder 8* using the granular powder A1 alone, Powder 15* using the granular powder A2 alone, and Powder 1* using the granular powder B alone provided poor initial permeability μi and permeability increment μΔ. It has been found that the magnetic core powders of the present invention (Powders 4-7 and 10-13) have high permeability and excellent DC superimposition characteristics advantageous for smaller coil devices.

What is claimed is:

1. A magnetic core powder comprising a granular powder A of an Fe-based, magnetic, crystalline metal material and a granular powder B of an Fe-based, magnetic, amorphous metal material;

said granular powder A having a composition of aFe bSi cCr dAl eC, wherein a=100−b−c−d−e, 0≤b≤12.0, 0≤c≤8.0, 0≤d<13.8, and 0≤e≤0.5, on a %-by-mass basis;

said granular powder B being an Fe—Si—B-based, amorphous, magnetic metal material having a composition of $(Fe_{1-x}Cr_x)_a(Si_{1-y}B_y)_{100-a-b}C_b$, wherein x and y meet $0<x\leq 0.06$, and $0.3\leq y\leq 0.7$ by atomic ratio, and a and b meet $70\leq a\leq 81$, and $0<b\leq 2$ by atomic %, and/or an Fe—P—C-based, magnetic, amorphous metal material having a composition of $Fe_{100-x-y}P_xC_y$, wherein $6.8\%\leq x\leq 13.0\%$, and $2.2\%\leq y\leq 13.0\%$ by atomic %;

the particle size d50A of said granular powder A at a cumulative frequency of 50% by volume being 0.5 μm or more and 7.0 μm or less, and the particle size d50B of said granular powder B at a cumulative frequency of 50% by volume being more than 15.0 μm, in a cumulative distribution curve showing the relation between a particle size and a cumulative frequency from the smaller particle size side, which is determined by a laser diffraction method; and said magnetic core powder meeting (d90M−d10M)/d50M of 1.6 or more and 6.0 or less, wherein d10M represents the particle size of said magnetic core powder at a cumulative frequency of 10% by volume, d50M represents the particle size of said magnetic core powder at a cumulative frequency of 50% by volume, and d90M represents the particle size of said magnetic core powder at a cumulative frequency of 90% by volume, wherein said granular powder A is present in a mixing ratio of 30% by mass to 70% by mass, wherein the mixing ratio is a ratio of the mass of said granular powder A to the sum of the mass of said granular powder A and the mass of said granular powder B.

2. The magnetic core powder according to claim 1, wherein said d50A is 1.0 μm or more and 5.0 μm or less.

3. The magnetic core powder according to claim 1, wherein said Fe-based, magnetic, crystalline metal material is at least one magnetic crystalline material selected from the group consisting of pure iron, Fe—Si—based, magnetic, crystalline materials; Fe—Si—Cr-based, magnetic, crystalline materials; Fe—Si—Al-based, magnetic, crystalline materials; and Fe—Cr—Al-based, magnetic, crystalline materials.

4. A magnetic core using the magnetic core powder recited in claim 1.

5. A coil device comprising the magnetic core recited in claim 4.

* * * * *